United States Patent [19]
Goldstein et al.

[11] Patent Number: 6,128,735
[45] Date of Patent: Oct. 3, 2000

[54] METHOD AND SYSTEM FOR SECURELY TRANSFERRING A DATA SET IN A DATA COMMUNICATIONS SYSTEM

[75] Inventors: Gary Allan Goldstein, Fort Worth; Terence Edward Sumner, Azle, both of Tex.

[73] Assignee: Motorola, Inc., Schaumburg, Ill.

[21] Appl. No.: 08/978,392

[22] Filed: Nov. 25, 1997

[51] Int. Cl.[7] .................................................. H04K 1/00
[52] U.S. Cl. .......................................... 713/166; 713/200
[58] Field of Search ............................... 380/49, 141, 41; 713/200, 166; 455/61

[56] References Cited

U.S. PATENT DOCUMENTS

| | | | |
|---|---|---|---|
| 5,455,861 | 10/1995 | Faucher et al. | 380/9 |
| 5,555,309 | 9/1996 | Kruy | 380/21 |
| 5,596,718 | 1/1997 | Boebert et al. | 395/187.01 |
| 5,721,781 | 2/1998 | Deo et al. | 380/25 |
| 5,857,022 | 1/1999 | Sudia | 380/23 |

*Primary Examiner*—Tod R. Swann
*Assistant Examiner*—Todd Jack
*Attorney, Agent, or Firm*—L. Bruce Terry

[57] ABSTRACT

In a telecommunications system, data having a higher sensitivity and data having a lower sensitivity are identified within a data set. The data having a higher sensitivity is encrypted to produce encrypted sensitive data. Thereafter, the data having a lower sensitivity and the encrypted sensitive data are encrypted to produce an encrypted data set. The encrypted data set is then transferred from a sending unit to a receiving unit. Decryption information may be appended to the encrypted sensitive data before the data having a lower sensitivity and the encrypted sensitive data are encrypted to produce an encrypted data set. The decryption information may include an algorithm identifier, a key identifier, and receiver response instructions. At the receiving unit, the data set is decrypted to recover the data having lower sensitivity. A second decryption of the encrypted sensitive information recovers the data having a higher sensitivity. Appended decryption information may be used to locate and decrypt the encrypted sensitive information.

20 Claims, 5 Drawing Sheets

METHOD AND SYSTEM FOR SECURELY TRANSFERRING A DATA SET IN A DATA COMMUNICATIONS SYSTEM

FIELD OF THE INVENTION

The present invention is related in general to secure data transmission in a communications system, and more particularly to an improved method and system for encrypting, transferring and decrypting a data set in a telecommunications system using different security levels for different portions of the data set.

BACKGROUND OF THE INVENTION

The desire to communicate privately is a human trait that dates back to earliest times. There are also good business reasons to maintain privacy in telecommunications systems. For example, users of these telecommunications systems are frequently transferring sensitive data, such as financial data or passwords, in order to conduct business transactions, or access sensitive data or controls. Purchasing goods and services via the internet is another example where sensitive data is transferred using a telecommunication system, the internet.

In a cellular communications system, sensitive data associated with cellular subscribers is routinely transferred throughout the cellular communication system and other networks that connect to other databases or centers for authorization. Such sensitive information may include a subscriber's credit card, secret keys, mobile equipment serial numbers, passwords, and the like. This information may be communicated via radio frequency (RF) transceivers, mobile switching equipment, and leased lines in the public switched telephone network (PSTN).

In the past, most security management efforts have been directed to detection, containment, and recovery; efforts directed toward preventing secure information from being collected have been lacking.

In addition to the need for additional security, government export controls of strong encryption algorithms have become a problem for telecommunications systems manufacturers that compete in international markets. For example, in the United States, the government will not allow the export of strong encryption algorithms, while many other world governments do not have the same restrictions. This may place United States manufactures at a disadvantage when bidding for telecommunications systems installations in foreign countries.

Within the United States, the government allows the encryptions of different types of data at different levels of security. For example, the U.S. government mandates that voice information or voice data be encrypted at a level that can be monitored by authorized government agencies, or otherwise provide monitoring capability by an authorized government agency. The U.S. government allows a higher level of encryption for financial, access, and control data. The level of security of the encryption method relates to the complexity of the encryption algorithm, the length of the key used during encryption, and, to a lesser extent in higher security encryption techniques, the control of access to the algorithm's operational details.

Therefore, one solution that provides for the simultaneous needs of eaves dropping by an authorized government agency and the protection of highly secure financial and control information uses two different encryption engines—one to encrypt voice data at a lower security level, and another to encrypt financial or control data at a higher security level. A problem with this solution is that when the higher and lower security data streams are monitored the streams may be clearly identifiable by headers needed to separate the two levels of encrypted data. This points out to the unauthorized eaves dropper exactly where in the data stream the highly sensitive data resides. This highlighted exposure of highly sensitive data increases the probability that the eaves dropper may decipher the sensitive information because multiple instances of the encrypted sensitive information are readily available to the eaves dropper.

Therefore, a need exists for an improved method and system for securely transferring a data set in a telecommunications system, wherein data in the data set may be encrypted with different levels of security and the more secure portion of the data set is not readily apparent to an eaves dropper.

BRIEF DESCRIPTION OF THE DRAWINGS

The novel features believed characteristic of the invention are set forth in the appended claims. The invention itself, however, as well as a preferred mode of use, further objects, and advantages thereof, will best be understood by reference to the following detailed description when read in conjunction with the accompanying drawings, wherein:

DETAILED DESCRIPTION OF THE INVENTION

Figure 1:
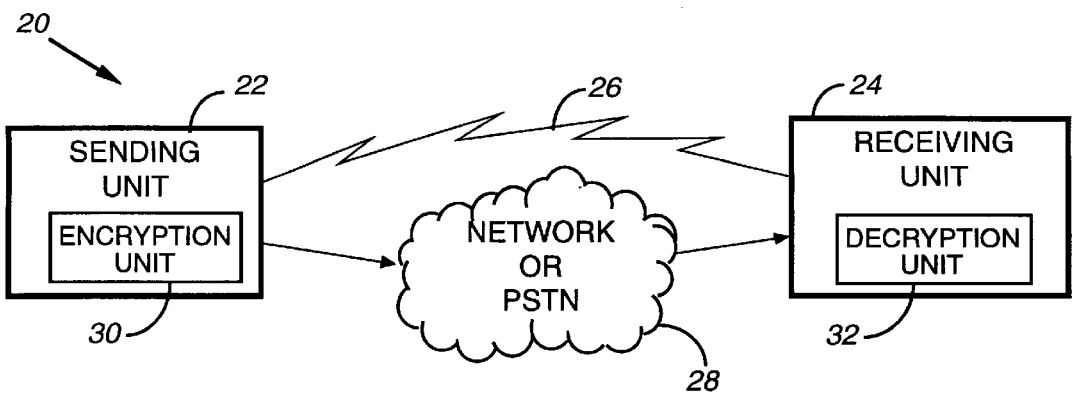
FIG. 1 depicts a telecommunications system.

With reference now to FIG. 1, there is depicted a block diagram of a telecommunications system, which may be used to implement the method and system of the present invention. As illustrated, telecommunication system 20 includes sending unit 22 and receiving unit 24. Sending unit 22 and receiving unit 24 may be coupled via any one of several known coupling means, such as wireless data channel 26 or network 28. In order to provide security for data sets transferred from sending unit 22 to receiving unit 24, sending unit 22 includes encryption unit 30 and receiving unit 24 includes decryption unit 32.

In this document, data encryption means more than data encoding for the purpose of improving the reliability or sensitivity of a data channel. As used herein, data encryption is the manipulation of data for the express purpose of thwarting the efforts of an unwanted or unauthorized receiver or interceptor of the message represented by the data set. This type of "data manipulation" usually requires a key for both encrypting and decrypting the data.

Wireless data channel 26 may be implemented with any one of several known air interface standards, such as those standards used in the cellular telephone industry, the microwave communications industry, or the land mobile radio industry. More detailed information regarding air interface standards may be obtained from the principal communications standards bodies including: the International Telecommunications Union (ITU); the United States ANSI Committee T1 on telecommunications and the Telecommunication Industry Association (TIA); the European Telecommunications Standards Institute (ETSI); the Japanese Telecommunications Technology Committee (TTC); and the Institute of Electrical and Electronics Engineers (IEEE). Similarly, standards describing communication with network 28 are also maintained by some of these same standards bodies. Note that network 28 also includes the public switch telephone network (PSTN), for which the IEEE and the Consultive Committee on International Telephone and Telecommunications (CCITT) maintain telephone system standards.

With regard to FIG. 1, it is important to recognize that the media coupling sending unit 22 to receiving unit 24 is not important to the present invention. The media may be any known media, including air, wire, or fiber. The present invention deals with the processing of data at sending unit 22 and receiving unit 24, and not the means by which the data is transferred between the two.

Figure 2:
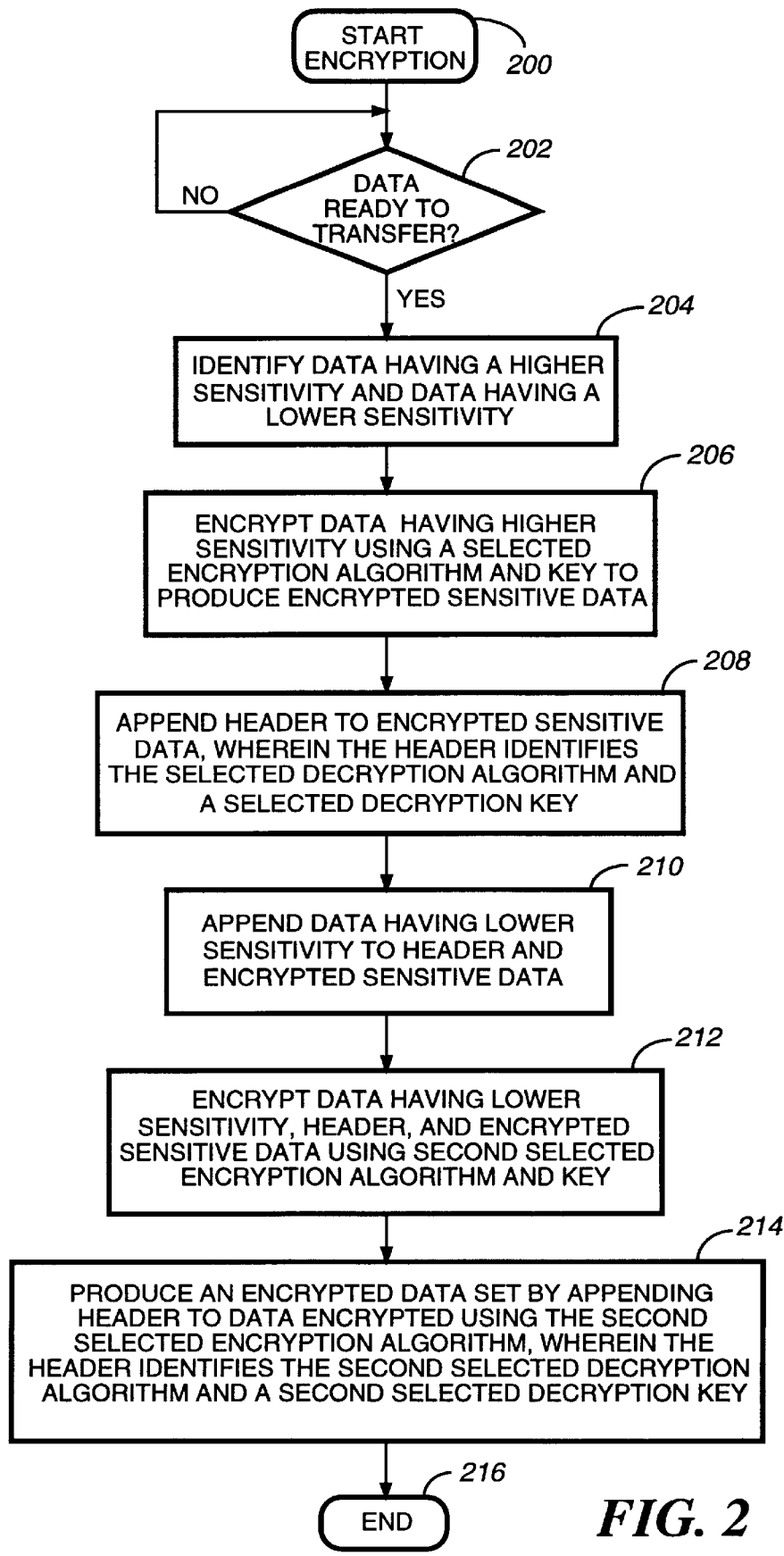
FIG. 2 is a high-level logical flowchart that illustrates the data encryption operation of the method and system of the present invention.

With reference now to FIG. 2, there is depicted a high-level logical flowchart that illustrates an encryption process in accordance with the method and system of the present invention. As illustrated, the process begins at block 200, and thereafter passes to block 202 wherein the process determines whether or not data is ready to transfer from the sending unit to the receiving unit. If data is not ready to transfer, the process iteratively loops as shown by the "no" branch from block 202. Several conditions may result in data not being ready to transfer. For example, if the data represents voice, someone must speak in order for voice data to be produced. If the data represents financial information or access information, a transaction requiring such information must be initiated. During such a transaction, the system may prompt the user to enter a credit card number.

If data is ready to transfer, the process then identifies data having a higher sensitivity and data having a lower sensitivity in the group of data that is ready to transfer, as illustrated at block 204. Data having a higher sensitivity may include credit card data, or other financial data. Other data that may be regarded as having higher sensitivity may include password data, decryption key data, data that controls access to systems or other information, personal data such as home addresses and phone numbers, or the like. Data having a lower sensitivity may include data that represents voice or other audio information, data representing pictures or graphics, data representing text or other low security computer generated information, or the like.

Once the data having a higher sensitivity is identified, the process encrypts the data having higher sensitivity using a selected encryption algorithm and selected key to produce encrypted sensitive data, as depicted at block 206. In some embodiments of the present invention, multiple encryption engines may be available for encrypting data. Examples of algorithms used by these available encryption engines include DES (Digital Encryption Standard), RSA (Rivest Shamir Adleman) Encryption Algorithm such as RC-2 and RC-4, government controlled Fascinator/Indictor algorithms and the like. Furthermore, the available encryption engines may have the ability to encrypt files at different levels of encryption security. Preferably, the higher security encryption algorithm is selected to encrypt the higher sensitivity data.

Additionally, each available encryption engine may be associated with several encryption keys, which also may be individually selected. Thus, the encryption engine and an appropriate key are selected as a pair to ensure the key works with the encryption engine. As used here, key means not only a seed number or a other well known primary keying information, but also any necessary time or sequence offset information for synchronous algorithms.

After the higher sensitivity data is encrypted, the process appends a header to the encrypted sensitive data, wherein the header contains decryption information, such as identification of a selected description algorithm, a selected decryption key, as illustrated at block 208. This header contains information used by the receiving unit to select a decryption algorithm and a decryption key. User defined data may also be included in the header. User defined data may instruct the receiving unit how to respond under certain conditions.

Next, the process appends the data having lower sensitivity to the header and the encrypted sensitive data, as depicted at block 210. This operation creates a block of data which is then encrypted using a second selected encryption algorithm and a second selected key, as illustrated at block 212. According to an important aspect of the present invention, the encrypted sensitive data is encrypted a second time using the second selected encrypted algorithm and the second selected key. This second encryption adds to the security of the encrypted sensitive data by embedding it in a later encrypted block of data. This step also hides the header, which may conspicuously point out the presence and location of the encrypted sensitive data.

In a preferred embodiment of the present invention, the encryption algorithm and key used in block 206 will have a higher level of security than the encryption algorithm and key used in block 212 to perform the second encryption operation. However, in other embodiments of the invention, the same encryption algorithm and same encryption engine may be used in both blocks 206 and 212.

While the same encryption engine may be used, a preferred embodiment of the invention uses different keys for the operations of blocks 206 and 212. Two keys are preferred because some studies show that re-encryption with the same key may reduce the security of the encrypted data.

Finally, the process produces an encrypted data set by appending a header to the data encrypted using the second selected encryption algorithm, wherein the header contains decryption information used by the receiving unit to identify a second selected decryption algorithm and a second selected decryption key, as depicted at block 214. The process then terminates, as shown at block 216.

While the encryption algorithm shown in FIG. 2 encrypts a data block having two levels of sensitivity, data blocks having more than two levels of sensitivity may be encrypted according to the present invention by looping through the flowchart of FIG. 2 from, for example, block 210 to block 216 for each level of sensitivity represented in the data ready to transfer.

Figure 3:
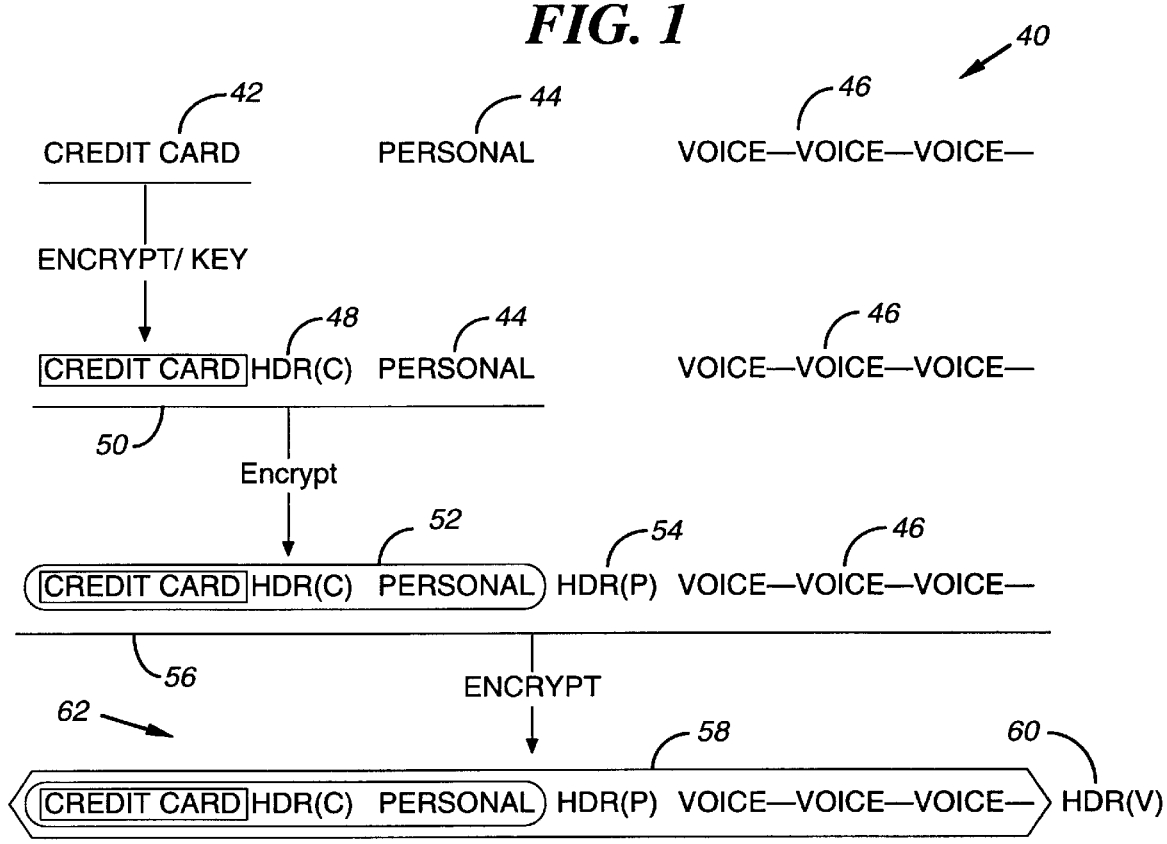
FIG. 3 graphically represents the selection and encryption of data having multiple levels of sensitivity in accordance with the method and system of the present invention.

To further illustrate this principle, FIG. 3 shows data ready to transfer 40 having three levels of sensitivity: high sensitivity data 42, medium sensitivity data 44, and low sensitivity data 46. As discussed with reference to FIG. 2, high sensitivity data 42 is encrypted and header 48 is appended to identify an appropriate decryption algorithm and decryption key. Next, medium sensitivity data 44 is appended to produce data block 50, which is then encrypted to produce encrypted data block 52. Next, header 54 and low sensitivity data 46 are appended to encrypted data block 52 to form data block 56. Data block 56 is then encrypted to produce encrypted data block 58. Thereafter, header 60 is then appended to encrypted data block 58 which forms data set 62, which is ready for transfer from sending unit 22 to receiving unit 24.

Data set 62 represents the encryption of data having three levels of sensitivity. This encryption may be performed using any combination of encryption engines and encryption keys. Note that to an eaves dropper, the data stream appears as header 60 followed by encrypted data block 58. Header 54 and header 48 are encrypted within encrypted data block 58, and therefore do not alert the eaves dropper to the location of highly sensitive data. Hiding the sensitive data and their associated headers makes it more difficult for the eaves dropper to intercept information—which is an important advantage of the present invention.

In an alternate embodiment of the example shown in FIG. 3, each data block 50 or 56 may contain more than one header, each associated with an encrypted data block. During decoding, the encrypted data blocks and associated headers are located and decrypted separately according to information in each header.

Figure 4:
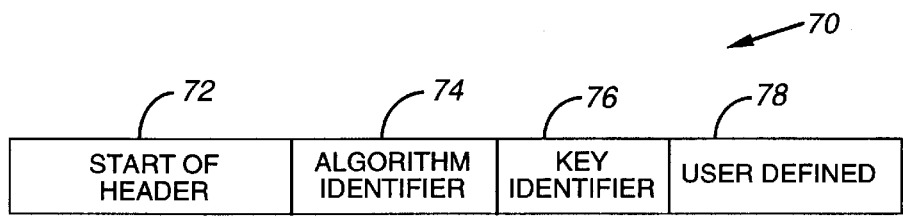
FIG. 4 depicts a header in accordance with the method and system of the present invention.

With reference now to FIG. 4 there is depicted an example header which may be used to implement the method and system of the present invention. As illustrated, header 70 includes start of header identifier 72, algorithm identifier 74, key identifier 76, and user defined data 78. Start of header identifier 72 may be a series of bits or characters that are easily located in a block of data which is scanned during decryption. An example of such a character is the ASCII (American Standard Code for Information Interchange) SOH (start of header) character, or any other non-printable character negotiated between the sending unit and receiving unit.

Algorithm identifier 74 is used at the receiving unit to identify an appropriate decryption algorithm for decrypting the encrypted data block that follows the header. Similarly, key identifier 76 identifies an appropriate key in the receiving unit that should be used to decrypt the encrypted data block. Both algorithm identifier 74 and key identifier 76 may be implemented as pointers that address a table of available decryption engines and decryption keys. Note that the sending unit must encrypt data in a manner that the receiving unit can decrypt. This includes considering what decryption engines and what decryption keys are available at the receiving unit. Therefore, before the sending unit selects an encryption engine, there may be some negotiation regarding compatibility of available encryption and decryption engines. Similarly, before selecting a key for encryption, the availability of keys may be queried, or new keys may be exchanged in a manner known in the art.

User defined data 78 may include information that helps the decryption processing in receiving unit 24. Such information may include the size of the encrypted data block that follows the header, a destination for the decrypted information, error control information, a sequence number for reconstructing a block of information, or the like. Additionally, user defined data may include information instructing the receiving unit how to respond to the data set. For example, the sending unit may enclose user defined data that instructs the receiving unit to acknowledge receipt of the data set, or to acknowledge successful decryption of the data set. User defined data may be used to instruct the receiving unit how to recover from a decryption error.

These types of user defined data or decryption information may be broadly categorized as receiver response instructions, wherein the instructions cause the receiver to respond in a particular manner to a particular condition.

In yet another embodiment, user defined data may be used to locate additional decryption information by, for example, identifying a trustee that holds decryption information in escrow related to the decryption key and algorithm identifier. The trustee may be a trusted third party, such as a certificate authority. Thus, with this "escrow information," an authorized person or agency would not need to computationally determine the decryption key. Instead, the decryption key may be recovered from escrow with an appropriate procedure and evidence.

Figure 5:
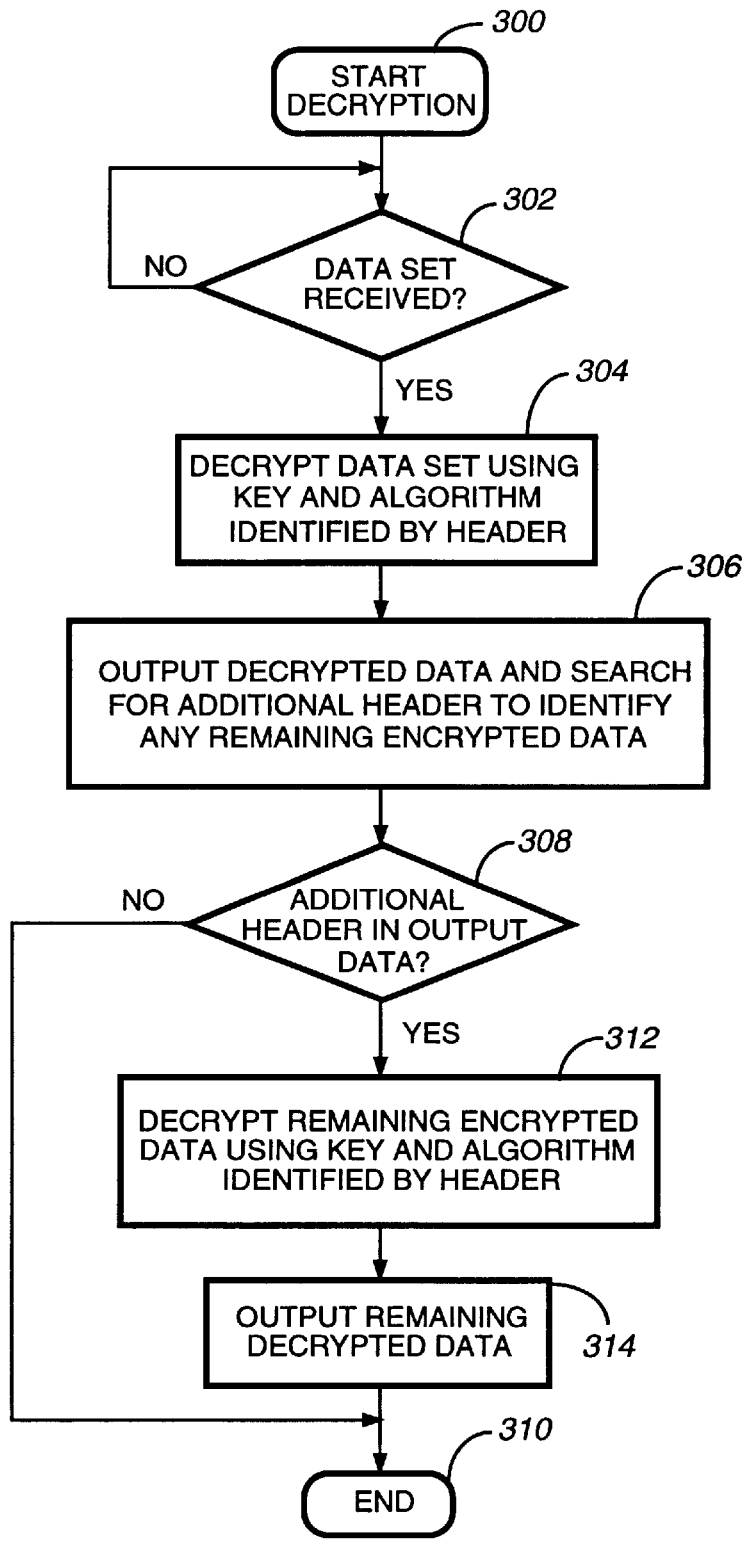
FIG. 5 is a high-level logical flowchart that illustrates the data decryption operation of the method and system of the present invention.

With reference now to FIG. 5, there is depicted a high-level logical flowchart that illustrates the process of decrypting a data set in accordance with the method and system of the present invention. As illustrated, the process begins at block 300, and thereafter passes to block 302 wherein the process determines whether or not the data set has been received. If the data set has not been received, the process iteratively loops via the "no" branch until the data set has been received.

Once the data set has been received, the process decrypts the data set using the decryption key and decryption algorithm identified by decryption information in the header, as illustrated at block 304.

Next, the process outputs the decrypted data and searches for additional headers that identify any remaining encrypted data, as depicted at block 306. Note that the output decrypted data needs no further decryption to be useful at the receiving unit. If the process finds additional headers, the receiving unit must do additional decryption to recover useful data. The process at block 306 may also be characterized as the separation of decrypted data from any remaining header and encrypted data.

Next, the process determines whether or not there was an additional header found in the decrypted output data, as illustrated at block 308. If a header was not found in the search, there is no remaining data to be decrypted, and the process terminates as depicted at block 310. If, however, an additional header was found in the search, the process decrypts the remaining encrypted data using the decryption key and decryption algorithm identified by the newly found header, as illustrated at block 312. Note that more than one header, and its associated encrypted data block, may be found at each level or layer of encryption.

Thereafter, the process outputs the remaining decrypted data, as depicted at block 314, and terminates, as shown at block 310.

Note that the example depicted in FIG. 5 shows decryption of a data set having two levels of data sensitivity. As mentioned above, and as shown in FIG. 3, additional levels of data sensitivity may be decrypted in the received data set. Each additional level of data sensitivity is identified by a header followed by an encrypted block.

Figure 6:
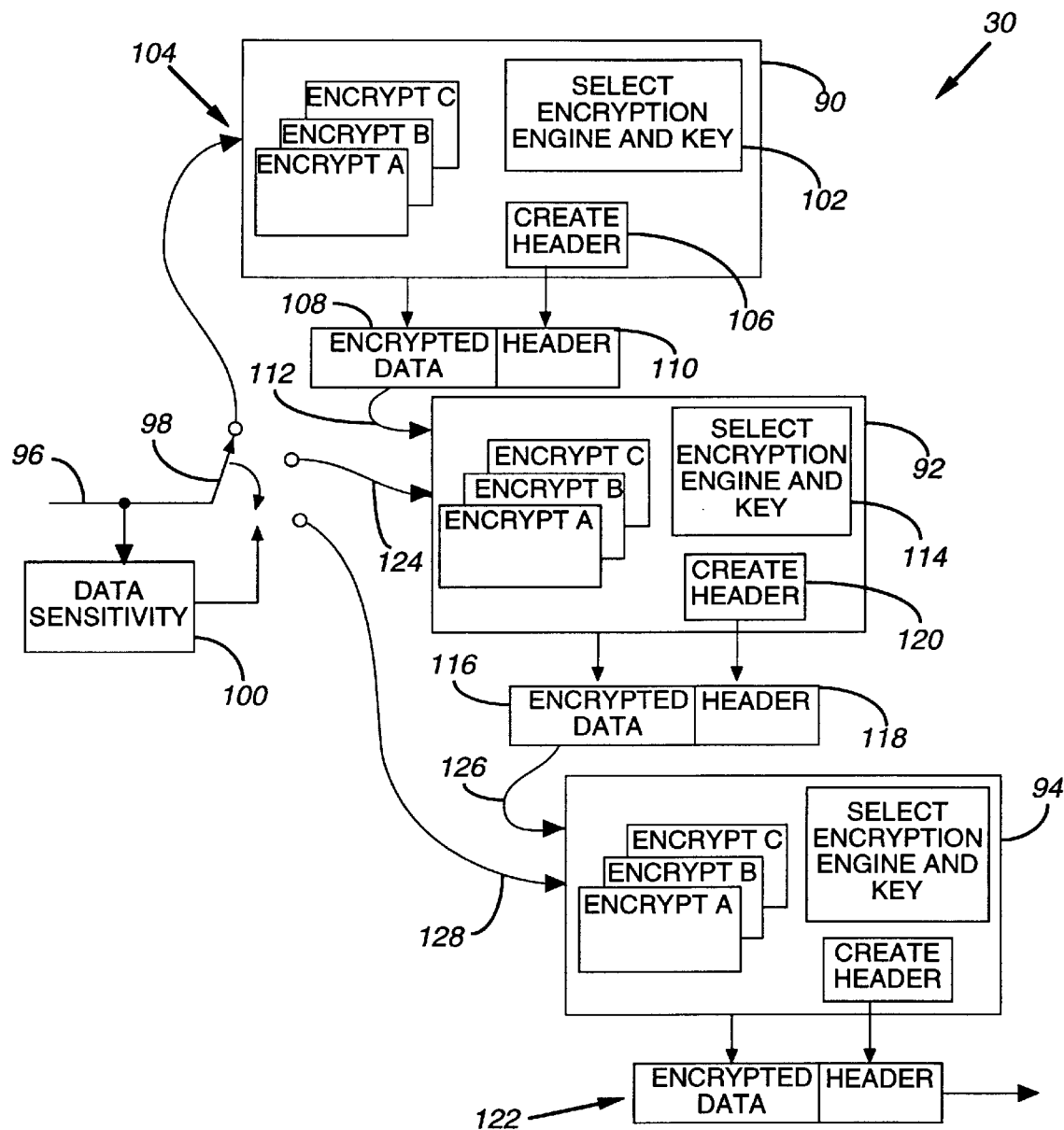
FIG. 6 depicts a data processing system that may be used to implement an encryption portion of a sending unit in accordance with the method of the present invention.

With reference now to FIG. 6, there is depicted a data processor which maybe used to implement encryption unit 30 in accordance with the method and system of the present invention. As illustrated, encryption unit 30 includes encryption engines 90–94 which may be selectively coupled to incoming data 96 by switch 98. Switch 98 is controlled by an output from data sensitivity detector 100, which monitors incoming data 96 and determines a level of data sensitivity. Data sensitivity detector is able to identify, for example, high sensitivity credit card information, medium sensitivity personal information, and low sensitivity voice data, as shown in FIG. 3.

In the example shown in FIG. 6, switch 98 is in a position for routing high sensitivity data to encryption engine 90. Encryption engine and key selector 102 may be used to select from multiple available encryption engines and keys that are available in encryption engine 90. Within encryption engine 90, there is depicted available encryption engines A, B, and C, from which encryption engine 90 may select to encrypt the high sensitivity data, available keys may be stored in memory.

Once data received at input 104 is encrypted using the selected encrypted engine and key, header creator 106 creates an appropriate header that identifies a decryption engine and a decryption key that may be used in the receiving unit to decrypt the encrypted data. The output of encryption engine 90 is an encrypted data block 108 and an appended header 110.

Encrypted data block 108 and header 110 are next input into encryption engine 92 at input 112. Thereafter, encryption engine 92 selects one of its available encryption engines and an encryption key using encryption engine and key selector 114. Encryption engine 92 then outputs encrypted data block 116 and header 118, which is created by header creator 120.

In a similar manner, encrypted data block 116 and header 118 are input into encryption engine 94 which finally produces data set 122, which is ready to transfer from the sending unit to the receiving unit.

Note that in encryption engine 92, encrypted data block 108 and header 110 may be combined or appended with data from input 124, which has a lower sensitivity as determined by data sensitivity selector 100. Similarly, data at inputs 126 and 128 may be combined or appended before encryption, which finally produces data set 122, which is output by encryption engine 94. Thus, an appropriate delay at inputs 124 and 128 may be required in order to form a data block comprising encrypted data, an associated header, and unencrypted lower sensitivity data. This delay ensures that the multiple-level encryption shown in FIG. 3 takes place with the appropriate timing.

While FIG. 6 shows three encryption engines 90–94, each having multiple available encryption engines from which it can select, an alternate embodiment of the present invention may iteratively reuse a single encryption engine by providing a feedback loop for the encrypted data and the header. This feedback loop would route the encrypted data and header at the output back to the input of the encryption engine. If any lower sensitivity data were available, it would be appended to the fedback encryption data and header to form a single data block for encryption.

Figure 7:
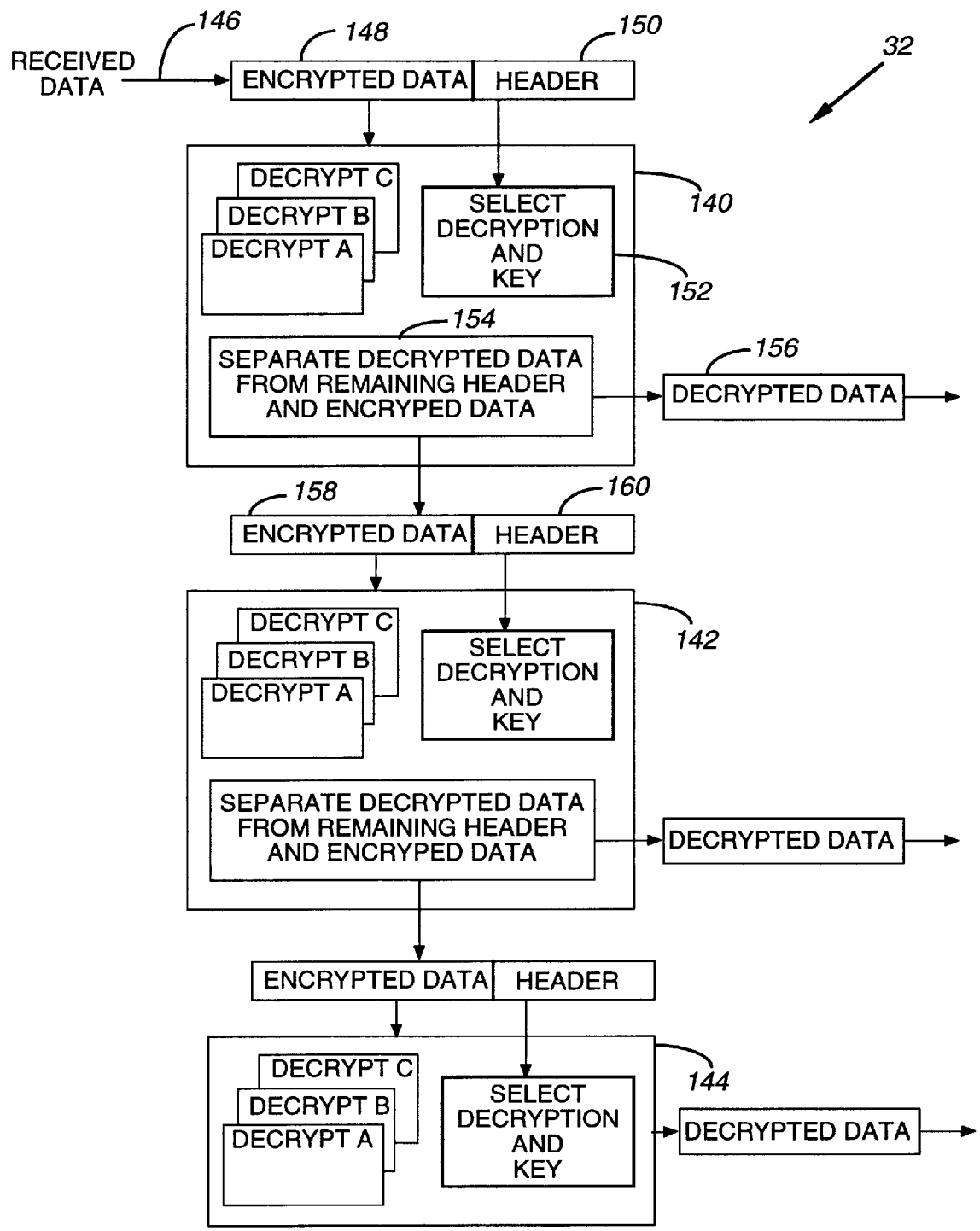
FIG. 7 illustrates a data processing system that may be used to implement a decryption portion of a receiving unit in accordance with the method and system of the present invention.

Finally, with reference now to FIG. 7, there is depicted a high-level block diagram of a data processor which may be used to implement a decryption unit in accordance with the method and system of the present invention. As illustrated, decryption unit 32 includes available decryption engines 140–144. Received data 146 comprises encrypted data block 148 and header 150. Decryption engine and key selector 152 receives header 150 and uses it to select one of available decryption engines A, B, and C. An appropriate decryption key is also selected based upon information in header 150.

Following the decryption by the selected decryption engine, data separator 154 separates decrypted data from any remaining header and encrypted data, and outputs decrypted data 156 and encrypted data block 158 with appended header 160. If there was only one level of encryption in received data 146, all data is output as decrypted data 156 from decryption engine 140. However, if multiple levels of encryption are detected, encrypted data 158 and appended header 160 are separated and passed along to decryption engine 142.

Decryption engine 142 operates in a manner similar to that described in relation to decryption engine 140. The same is also true of decryption engine 144, except for the fact that decryption engine 144 does not include a data separator because decryption unit 32 in this example is designed for only three levels of data sensitivity. A decryption unit having more than three levels of data sensitivity may be designed according to the principles discussed and illustrated above.

While decryption unit 32 in FIG. 7 has been shown with three separate decryption engines 140–144, an alternate embodiment of the present invention may iteratively use one decryption engine with a feedback loop to decrypt received data 146 with multiple levels of encryption. In this alternate embodiment, encrypted data 158 and header 160 may be fed back into the input of decryption engine 140 to further decrypt the higher sensitivity data.

In yet another embodiment of the invention, a single encryption engine having only one encryption algorithm may be iteratively used for multiple encrypting a data set in the sending unit, and a single algorithm decryption may likewise be iteratively used in the receiving unit to decrypt the multiple layers of encryption.

If this single algorithm encryption unit is implemented, some studies show that different keys should be used for the encryption of each level of data sensitivity in order to increase the security of data that is re-encrypted with the same algorithm.

In an alternate embodiment of the present invention where either the frame structure is constant, or known at the receiving unit beforehand, the headers may be omitted because they do not add any information the receiving unit does not already know. In yet another embodiment, the structure and decoding information of a following data set may be encrypted in a previous data set.

The foregoing description of a preferred embodiment of the invention has been presented for the purpose of illustration and description. It is not intended to be exhaustive or to limit the invention to the precise form disclosed. Modifications or variations are possible in light of the above teachings. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method for securely transferring a data set in a telecommunications system comprising the steps of:

within the data set, identifying data having a higher sensitivity and data having a lower sensitivity;

encrypting the data having a higher sensitivity to produce encrypted sensitive data;

encrypting the data having a lower sensitivity and the encrypted sensitive data to produce an encrypted data set; and transferring the encrypted data set from a sending unit to a receiving unit.

2. The method for securely transferring a data set in a telecommunications system according to claim 1 further including the step of appending decryption information to the encrypted sensitive data.

3. The method for securely transferring a data set in a telecommunications system according to claim 2 wherein the decryption information further includes an algorithm identifier.

4. The method for securely transferring a data set in a telecommunications system according to claim 2 wherein the decryption information further includes a key identifier.

5. The method for securely transferring a data set in a telecommunications system according to claim 2 wherein the decryption information further includes receiver response instructions.

6. The method for securely transferring a data set in a telecommunications system according to claim 1 wherein the step of encrypting the data having a higher sensitivity to produce encrypted sensitive data further includes:

encrypting the data having a higher sensitivity with an algorithm having higher security to produce encrypted sensitive data;

and wherein the step of encrypting the data having a lower sensitivity and the encrypted sensitive data to produce an encrypted data set further includes:

encrypting the data having a lower sensitivity and the encrypted sensitive data with an encryption algorithm having lower security to produce an encrypted data set.

7. The method for securely transferring a data set in a telecommunications system according to claim 1 further including the steps of:

decrypting the encrypted data set;

recovering the data having a lower sensitivity and the encrypted sensitive data;

decrypting the encrypted sensitive data; and recovering the data having a higher sensitivity.

8. The method for securely transferring a data set in a telecommunications system according to claim 7 wherein the step of decrypting the encrypted data set further includes decrypting the encrypted data set using decryption information appended to the encrypted sensitive data.

9. The method for securely transferring a data set in a telecommunications system according to claim 8 wherein the decryption information appended to the encrypted sensitive data includes receiver response instructions, and further including the steps of:

detecting a condition in the receiving unit; and in the receiving unit, responding to the detected condition in a manner described in the receiver response instructions.

10. A system for securely transferring a data set in a telecommunications system comprising:

means for identifying data having a higher sensitivity and data having a lower sensitivity, within the data set;

means for encrypting the data having a higher sensitivity to produce encrypted sensitive data;

means for encrypting the data having a lower sensitivity and the encrypted sensitive data to produce an encrypted data set; and means for transferring the encrypted data set from a sending unit to a receiving unit.

11. The system for securely transferring a data set in a telecommunications system according to claim 10 further including means for appending decryption information to the encrypted sensitive data.

12. The system for securely transferring a data set in a telecommunications system according to claim 11 wherein the decryption information further includes an algorithm identifier.

13. The system for securely transferring a data set in a telecommunications system according to claim 11 wherein the decryption information further includes a key identifier.

14. The system for securely transferring a data set in a telecommunications system according to claim 11 wherein the decryption information further includes receiver response instructions.

15. The system for securely transferring a data set in a telecommunications system according to claim 10 wherein the means for encrypting the data having a higher sensitivity to produce encrypted sensitive data further includes:

means for encrypting the data having a higher sensitivity with an algorithm having higher security to produce encrypted sensitive data;

and wherein the means for encrypting the data having a lower sensitivity and the encrypted sensitive data to produce an encrypted data set further includes:

means for encrypting the data having a lower sensitivity and the encrypted sensitive data with an encryption algorithm having lower security to produce an encrypted data set.

16. The system for securely transferring a data set in a telecommunications system according to claim 10 further including:

means for decrypting the encrypted data set;

means for recovering the data having a lower sensitivity and the encrypted sensitive data;

means for decrypting the encrypted sensitive data; and means for recovering the data having a higher sensitivity.

17. The system for securely transferring a data set in a telecommunications system according to claim 16 wherein the means for decrypting the encrypted data set further includes means for decrypting the encrypted data set using decryption information appended to the encrypted sensitive data.

18. The system for securely transferring a data set in a telecommunications system according to claim 17 wherein the decryption information appended to the encrypted sensitive data includes receiver response instructions, and further including:

means for detecting a condition in the receiving unit; and in the receiving unit, means for responding to the detected condition in a manner described in the receiver response instructions.

19. A system for securely transferring a data set in a telecommunications system comprising:

a data sensitivity detector coupled to a data set for identifying data having a higher sensitivity and data having a lower sensitivity, within the data set;

an encryption engine coupled to the data sensitivity detector for encrypting the data having a higher sensitivity to produce encrypted sensitive data;

a second encryption engine coupled to the data sensitivity detector and the encrypted sensitive data for encrypting the data having a lower sensitivity and the encrypted sensitive data to produce an encrypted data set; and a transmission unit coupled to the encrypted data set for transferring the encrypted data set from a sending unit to a receiving unit.

20. The system for securely transferring a data set in a telecommunications system according to claim 19 further comprising:

an encryption engine and key selector coupled to the data sensitivity detector for selecting an encryption algorithm and key in response to the data sensitivity detector;

a header creator coupled to the encryption engine and key selector for creating and appending to the encrypted sensitive data a header containing decryption information.

* * * * *